United States Patent

[11] 3,592,980

| [72] | Inventor | Leo Alamprese<br>Wooddale, Ill. |
|---|---|---|
| [21] | Appl. No. | 877,892 |
| [22] | Filed | Nov. 19, 1969 |
| [45] | Patented | July 13, 1971 |
| [73] | Assignee | Honeywell Inc.<br>Minneapolis, Minn. |

[54] PNEUMATIC STEP CONTROLLER WITH RECIPROCAL CAM MEANS
6 Claims, 4 Drawing Figs.

[52] U.S. Cl. ................................................ 200/81.4, 200/153 LA, 74/567
[51] Int. Cl. .................................................. H01h 35/26, H01h 3/42
[50] Field of Search .......................................... 200/5 C, 46, 153.11, 153.12, 153.13, 81, 81.4; 74/567

[56] References Cited
UNITED STATES PATENTS

| 2,870,273 | 1/1959 | Merchant | 200/153 (.12) X |
| 2,875,287 | 2/1959 | Van Sickle | 200/153 (.19) X |
| 3,219,769 | 11/1965 | Lutzen | 200/46 |
| 3,235,692 | 2/1966 | Kucerq | 200/5 (C) UX |

FOREIGN PATENTS

| 642,428 | 11/1960 | Italy | 200/153 (.12) |

Primary Examiner—Robert K. Schaefer
Assistant Examiner—Robert A. Vanderhye
Attorneys—Lamont B. Koontz and Omund R. Dahle ABSTRACT: A pneumatic step controller for use in a control system where a proportional pneumatic signal is to be converted into a sequenced switching action. The step controller includes a substantially rigid, rectangular, reciprocally movable, and molded or stamped cam plate which obviates many individual cam parts and costly cam calibration.

PATENTED JUL 13 1971
3,592,980
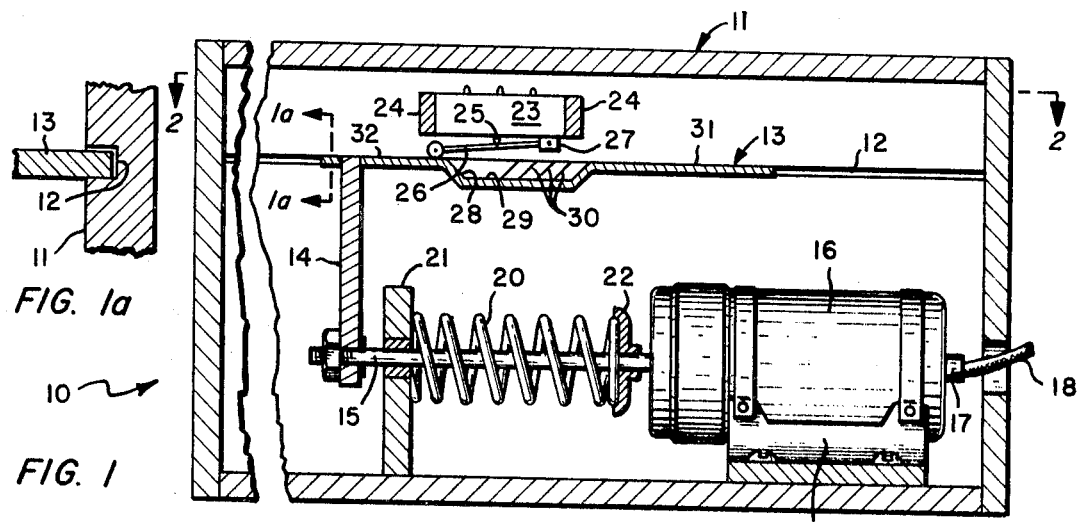
FIG. 1a
FIG. 1
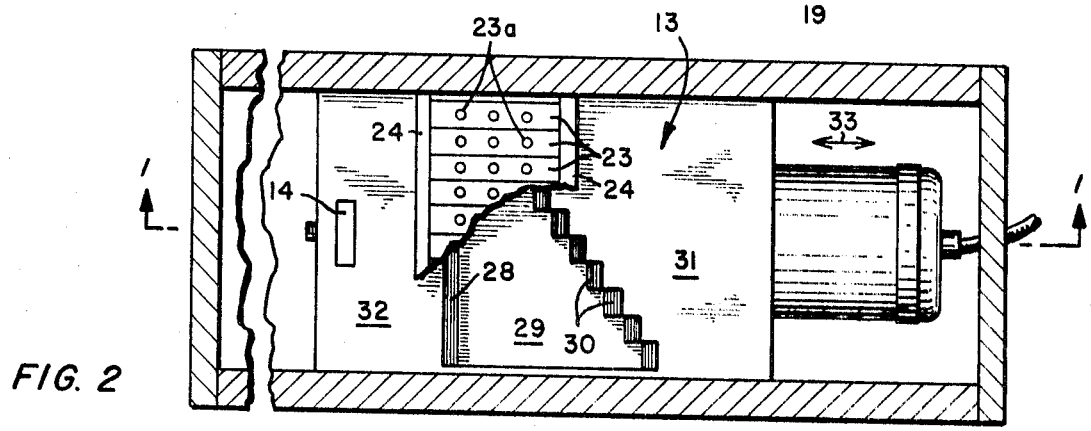
FIG. 2
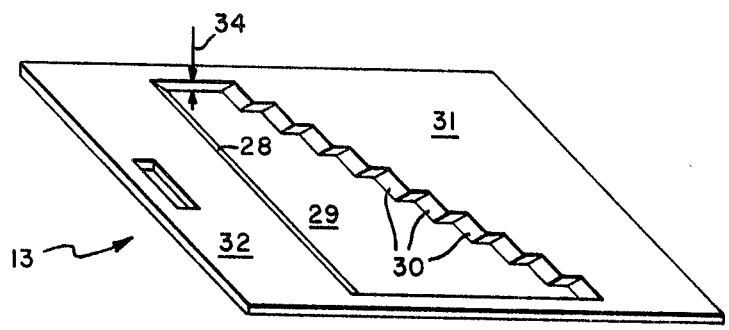
FIG. 3
INVENTOR.
LEO ALAMPRESE
BY Torrow B. Koory
ATTORNEY.

PNEUMATIC STEP CONTROLLER WITH RECIPROCAL CAM MEANS

This invention relates to a pneumatic step controller of the general type disclosed in U.S. Pat. No. 2,823,285 to Stone. More particularly this invention relates to a novel improvement in the camming means of a pneumatic step controller used in a control system where a proportional pneumatic signal is to be converted into a sequenced switching action.

In general the function of a step controller is that of an interface device. That is, in response to a first signal, the step controller causes the transmission of one or more second signals. In a pneumatic step controller a change in pressure delivered to the pneumatic motor causes some form of motion which culminates in the actuation of one or more switches. These switches may open or close electrical circuits including heating units, valves, or the like.

The switches in a pneumatic step controller are generally actuated by means of a crankarm linkage which converts linear motion from the pneumatic actuator to rotary motion at the cams, although they may also be actuated by means of a helical cam member as disclosed in the Stone patent. Also it is generally desired that the switches be actuated in a specific, predetermined sequence. When cam shaft means are utilized to actuate the switches, rather tedious adjustments of each cam are required in order to obtain the proper sequence of switching. When a helical cam member is utilized no adjustments for the proper sequence are necessary but the member must be carefully made and is therefore, relatively expensive. A further disadvantage of a helical cam is that its use results in the inaccessibility of some of the switches.

The subject invention overcomes the above disadvantages by providing a step controller including a single piece cam member which has built-in sequential switch actuating means, which accordingly obviates many individual cam parts and costly cam calibration, which directly utilizes the linear output of the actuator, which is easily and economically manufactured, and which has the further features of simplicity and compactness.

The present sequence controller comprises a cam member having a substantially rigid, rectangular, molded or stamped plate which is reciprocally driven by a pneumatic motor along appropriate guide means. One face of this cam plate engages the cam follower means of each of a plurality of switches and has thereon means to sequentially actuate said plurality of switches.

In the preferred embodiment, all switches are open in a zero pressure condition encountered during a power failure. Upon resumption of power and when the pressure reaches approximately 3 pounds per square inch, all switches are made. Upon a further increase in pressure the switches are sequentially broken, so that upon reaching approximately 9 pounds per square inch all switches are again open. This embodiment conforms to a conventional pneumatic air conditioning system, wherein an increasing branch line pressure corresponds to a decreasing demand for a condition change.

The constructional details and the operation of the step controller of the instant invention will become more apparent upon reading of the following detailed description of the invention and the appended claims in conjunction with the accompanying drawing, wherein:

FIG. 1 is sectional side elevation of the pneumatic step controller of this invention;

FIG. 1a is an enlarged view of the section 1a—1a in FIG. 1;

FIG. 2 is a plan view of the pneumatic step controller shown in FIG. 1 with portions thereof broken away;

FIG. 3 is a perspective view of the preferred embodiment of the cam plate.

In FIG. 1 the numeral 10 generally denotes a pneumatic step controller. A frame or support means 11 is shown to which are attached guide means 12, also illustrated in an enlarged view in FIG. 1a. A molded or stamped cam plate 13 is constructed and arranged to reciprocally slide along and between guide means 12.

Attached in driving relation to one end of the cam plate 13 is a member 14 which in turn is secured to a shaft 15. Said shaft is reciprocally driven by a pneumatic actuator 16 which is connected by means of a suitable connector 17 and a tube 18 to a pressure source (not shown). The pneumatic actuator is mounted by suitable means, such as flanges, 19, to the frame 11. A biasing force is provided by a spring 20 which encircles the shaft 15 and is longitudinally restrained by a member 21 of the frame and a suitable abutment 22 fixed to the shaft.

A plurality of switches 23 are suitably mounted on a pair of spaced members 24 which are, in turn, attached to the frame 11. Each of the plurality of switches includes a plunger means 25 which is adapted to actuate the internal snap acting switch mechanism (not shown). The plunger means of each switch engages a separate cam follower means 26 which is pivotably mounted at 27 to the switch. Upon an increase in pressure delivered to the pneumatic motor the motor shaft is caused to move to the left as viewed in the drawing, thereby compressing spring 20. Accordingly, the cam plate moves to the left resulting in cam follower means 26 moving off horizontal surface 32, down an inclined surface 28 and along a horizontal surface 29. The cam follower means, relative to the cam plate, continues to move along horizontal surface 29 until it engages one of a plurality of inclined surfaces 30 which are oppositely disposed with respect to the inclined surface 28. The cam follower means then moves up one of the inclined surfaces 30 and moves along the horizontal surface 31 until a pressure-spring force equilibrium is reached and the cam plate motion accordingly ceases. Upon a decrease in pressure the cam plate returns to the right and the cam follower means retraces its path along surfaces 31, 30, 29, 28 and 32. In the preferred embodiment the switches are opened while the cam follower means engages either of the surfaces 31 or 32 and the switches are closed while the cam follower means engages surface 29. The closing or opening of the switches occurs when the cam follower means moves down or up inclined surfaces 28 or 30.

In FIG. 2 the plurality of switches 23 are shown mounted in a line or row substantially perpendicular to the line of motion of the cam plate indicated by arrow 33. The easily accessible switch lead terminals 23a are shown, the three terminals representing the normally opened, the normally closed and the common contacts of the switch.

Referring to FIG. 3, surface 29 is sufficiently spaced apart, indicated by the distance 34, from surfaces 31 and 32 so as to provide a differential sufficient to operate the switches. Surfaces 32 and 29 are separated by inclined surface 28. Surfaces 29 and 31 are also separated by camming means, the preferred embodiment of which comprises a plurality of inclined surfaces or steps 30. These surfaces are so located on the cam plate as to provide the desired sequence of switching as the fluid pressure varies within a throttling range. Obviously the inclined surface 28 could also comprise a plurality of inclined surfaces rather than comprising a single inclined surface.

The function of inclined surface 28 is to provide a fail-safe condition in the event of either a pneumatic or an electric power failure. If the air pressure is dumped as a result of a power failure by means of a dump valve such as is disclosed in the Stone patent, or if air is lost as a result of a pneumatic failure, a fail-safe condition is assumed by virtue of inclined surface 28 causing the opening of the plurality of switches. The spring 20 is constructed and arranged so that said fail-safe condition is assumed as the fluid pressure falls below the throttling range.

There are clearly many other variations and alterations which may be made in this pneumatic step controller without departing from the spirit or scope of the invention. Accordingly it is the intent of the applicant to be limited only by the scope of the appended claims.

I claim:

1. A step controller comprising:

an actuator having a member driveable in one direction by fluid pressure and returnable in the opposite direction by biasing means;

support means;

a plurality of switches carried by the support means, each switch including actuating means and cam follower means to close and open the switch when suitably moved;

a cam member connected to the actuator member and linearly moveable relative to the support means, the cam member comprising a substantially rigid plate having on at least one face thereof means to operatively engage said cam follower means;

said means including first means arranged to sequentially open or close the plurality of switches as the actuator member is driven or returned, and second means arranged to substantially simultaneously open or close the plurality of switches when the fluid pressure reaches a predetermined level.

2. A step controller according to claim 1 wherein the actuator is adapted to be connected to the branch pressure line of condition responsive means having a predetermined throttling range, and the first means of the cam member is arranged to sequentially open or close the plurality of switches as the branch line pressure increases through the throttling range.

3. A step controller according to claim 2 wherein the second means of the cam member is arranged to substantially simultaneously open or close the plurality of switches when the branch line pressure falls below the throttling range and to substantially simultaneously close or open the plurality of switches when the branch line pressure enters the throttling range, whereby a fail-safe condition is provided.

4. A cam member for use in a step controller having a plurality of switch means, the cam member comprising a substantially rigid plate, at least one side of which plate comprises a first surface, a second surface, and a third surface:

the first, second and third surfaces being substantially parallel;

the first and third surfaces being in substantially the same plane;

the second surface being in a plane sufficiently spaced from the plane of said first and third surfaces to provide a differential sufficient to operate the switch means;

the first and second surfaces being separated by a first camming means arranged to substantially simultaneously actuate the plurality of switch means to provide a fail-safe condition; and the second and third surfaces being separated by a second camming means arranged to sequentially actuate the plurality of switch means.

5. A cam member as described in claim 4 wherein each of the plurality of switch means of the step controller includes cam follower means engageable by the first and second camming means to actuate the switch means, the cam member being suitably moveable so that the first and second camming means may engage the cam follower means upon such suitable movement.

6. A cam member as described in claim 5 wherein the second camming means comprises a plurality of inclined surfaces, each of the inclined surfaces being constructed and arranged to engage the cam follower means of a switch means.